United States Patent
Svenson et al.

[11] Patent Number: 6,109,555
[45] Date of Patent: Aug. 29, 2000

[54] FISHING REEL AND A METHOD OF BRAKING THE SPOOL THEREOF WITH LINE TENSION SENSOR

[75] Inventors: Jan Axel Svenson, Jonkoping; Ernst Robert Gosta Axelsson, Lekeryd; Roger William Ylikangas, Olofstrom, all of Sweden

[73] Assignee: Berkley, Inc., Spirit Lake, Iowa

[21] Appl. No.: 09/049,026

[22] Filed: Mar. 27, 1998

Related U.S. Application Data

[63] Continuation-in-part of application No. PCT/SE97/00261, Feb. 17, 1997.

[30] Foreign Application Priority Data

May 6, 1997 [SE] Sweden .................................. 9702130

[51] Int. Cl.[7] .............................................. A01K 89/0155
[52] U.S. Cl. ............................................ 242/287; 242/301
[58] Field of Search .................................... 242/287, 301, 242/417, 417.3, 421.8, 421.9

[56] References Cited

U.S. PATENT DOCUMENTS

| | | |
|---|---|---|
| 798,701 | 9/1905 | Rabbeth .................................. 242/287 |
| 1,609,684 | 12/1926 | Bellon . |
| 1,821,461 | 9/1931 | Chudley . |
| 1,888,087 | 11/1932 | Jacobsen . |
| 2,205,641 | 6/1940 | Wilson . |
| 2,262,462 | 11/1941 | Margis, Jr. . |
| 2,326,645 | 8/1943 | Hill . |
| 2,869,684 | 1/1959 | Tarbuck ............................... 242/421.9 |
| 3,319,903 | 5/1967 | Mosier .................................... 242/287 |
| 4,124,176 | 11/1978 | Carlson et al. . |
| 4,196,871 | 4/1980 | Kobayashi ............................. 242/287 |
| 5,289,992 | 3/1994 | Du Plessis et al. . |

FOREIGN PATENT DOCUMENTS

| | | |
|---|---|---|
| 667680 | 10/1929 | France . |
| 2057765 | 5/1971 | France . |
| 10052197 | 2/1998 | Japan . |
| 10052198 | 2/1998 | Japan . |
| 302384 | 7/1968 | Sweden . |
| 7009818 | 10/1974 | Sweden . |
| 7713421 | 3/1982 | Sweden . |
| 1126158 | 9/1968 | United Kingdom . |

*Primary Examiner*—Katherine A. Matecki
*Attorney, Agent, or Firm*—Roylance, Abrams, Berdo & Goodman, L.L.P.

[57] ABSTRACT

A fishing reel having a brake mechanism including a brake drum provided on a spool receiving a fishing line thereon. A line tension sensor for determining the tension of the fishing line is operatively connected to the brake mechanism which includes at least one brake for engaging the brake drum connected with the spool. Under the control of the line tension sensor the brake mechanism is engaged with the brake drum for pre-braking by friction the rotating spool at initial slack in the fishing line. The brake mechanism is engaged with the brake drum for abruptly stopping by wedging the spool at slack beyond the initial slack. Under the control of the line tension sensor, the brake mechanism frictionally engages the brake drum for pre-braking the rotating spool when slack is initially sensed in the fishing line. When slack beyond that initially sensed occurs, at least one brake of the brake mechanism is wedged against the brake drum for abruptly stopping the spool.

40 Claims, 11 Drawing Sheets

FISHING REEL AND A METHOD OF BRAKING THE SPOOL THEREOF WITH LINE TENSION SENSOR

CROSS REFERENCE TO RELATED APPLICATIONS

This application is a continuation in part of the International Application No. PCT/SE97/00261 for a Method in braking the spool in a reel and brake method for applying the method, filed Feb. 17, 1997 and mentioning the United States as a designated state.

BACKGROUND OF THE INVENTION

1. Field of the invention

The invention relates to a fishing reel having a spool receiving a fishing line thereon, and a method of braking the spool when slack occurs in the fishing line running from the spool as the fishing line is paid out therefrom.

2. Description of the Prior Art

It is a previously known technique to control braking the rotation of a spool when the fishing line is being paid out therefrom by using a line tension sensor operatively connected to a brake mechanism and actuated by slack occurring in the fishing line. U.S. Pat. Nos. 2,205,641, 2,262,462 and 5,289,992 disclose reels having a brake shoe which is biased to engage a brake disc or brake drum by means of a spring and operates as a friction brake and which is disengaged from the brake disc or the brake drum, respectively, by a line tension sensor connected to the brake shoe when the fishing line running from the spool in contact with the sensor is taut. Should the fishing line slack when the spool is rotating in the pay out direction the brake shoe will be engaged for frictional braking of the spool in order to prevent backlash. Backlash is the situation in which a great number of loose fishing line windings form on the spool and lead to a tangling of the fishing line. The line tension sensor described in U.S. Pat. No. 2,205,641 includes two bars positioned parallel to each other and interconnected by end pieces. The line tension sensor is mounted for pivotal movement about the axis of one of the bars. The fishing line passes the line tension sensor at the lower side of the one bar and through a slot formed by the other bar.

U.S. Pat. No. 1,609,684 discloses a brake mechanism for a fishing reel wherein a brake shoe which is spring biased to wedging engagement with a brake drum on the spool allows rotation of the spool in the pay out direction but not in the wind up direction. When the fishing line is taut, a line tension sensor, actuated by the fishing line, disengages the brake shoe from the brake drum to allow rotation of the spool in the wind up direction. Should the fishing line slack when being wound up, the spool is stopped abruptly by the brake mechanism which, however, has no influence on the spool when it is rotating in the pay out direction.

U.S. Pat. No. 2,326,645 discloses a brake mechanism for a reel having a brake shoe that is spring biased to effect its wedging against a brake drum connected with the spool when the spool is rotated as the fishing line is paid out. When the fishing line is taut, the brake shoe is lifted from the brake drum by the line tension sensor, actuated by the fishing line, so the spool can rotate freely in the pay out direction. If the fishing line should slack when being paid out, the brake operates and abruptly stops rotation of the spool.

The line tension sensor controlled wedge brake mechanisms used in prior art reels in order to stop the rotation of the spool when the outrunning fishing line is slacking have been too sensitive and have prematurely and abruptly stopped the spool when slack initially occurs in the fishing line. Moreover, conventional line tension sensor controlled friction brake do not operate sufficiently rapidly and are not sufficiently effective in preventing backlash.

Another problem in connection with prior art line tension sensor controlled brake mechanisms is that the brake mechanism is affected by vibrations of the fishing rod so that the brake mechanism can engage the brake drum when this is not called for in order to avoid backlash. A further problem with the prior art is that a fishing line consisting of a mono line passing over the line tension sensor and being bent over the sensor produces a resistance to the unwinding of the fishing line from the spool.

Positioning the line tension sensor downstream from a level line guide has also been a problem associated with conventional reels. The line tension sensors of these reels do not allow for smooth uninterrupted movement of the line between the reel and the fishing rod.

SUMMARY OF THE INVENTION

The main object of the present invention is to provide a fishing reel and a method of braking the spool thereof to effectively prevent backlash when there is an imminent risk of backlash occurring, such as during the rapidly accelerating slacking of the fishing line or an abrupt stopping of the fishing line during casting. The tendency of slacking of the fishing line is inhibited or substantially reduced at an early stage by the present invention so that the risk of backlash is removed before such risk will be imminent and an abrupt stop of the spool must be effected.

Another object of the invention is to provide a fishing reel having a brake mechanism controlled by a line tension sensor wherein the sensor due to slacking of the fishing line produces a large movement for controlling the engagement of the brake mechanism with the brake drum so that such engagement can be accurate and effective. This overcomes a problem existing in prior art line tension sensors, i.e., the difficulty in exactly determining the required amount of brake mechanism movement needed to avoid backlash when the line tension sensor initially moves as a result of a relatively small amount of initial slack in the fishing line. The small amount of initial slack can be due to the stiffness of the fishing line, usually a mono line of plastics, such as polyamide. An accurate control of the brake mechanism resulting from small movements of the line tension sensor requires a relatively complicated brake mechanism for a satisfactory function thereof.

According to one aspect of the invention there is provided a fishing reel for retaining a fishing line comprising a reel-frame having a first axis, a spool mounted in the reel-frame for rotation about the first axis and receiving the fishing line thereon and a brake member operatively connected to the spool. The brake mechanism acts upon the brake member for slowing the rotation of the spool. The brake mechanism includes a first brake for engaging the brake member and pre-braking the spool when initial slack occurs in the fishing line, and a second brake for engaging the brake member and abruptly stopping the spool when slack beyond the initial slack occurs in the fishing line. A line tension sensor mounted in the reel frame determines the tension of the fishing line and is operatively connected to the brake mechanism for engaging the first and second brakes with the brake member, as needed, when slack is sensed in the fishing line.

The invention also provides a method of braking a spool retaining a fishing line as slack occurs in the fishing line running from the spool when the fishing line is paid out therefrom. The method comprises the steps of sensing slack in the fishing line, pre-braking the spool when slack in the fishing line is initially sensed and abruptly braking the spool when increasing slack in the fishing line beyond the initial slack is sensed.

According to another aspect the invention, a fishing reel for retaining a fishing line comprising a reel-frame having first and second axes, a spool mounted in the reel-frame for rotation about the first axis and receiving the fishing line thereon and a brake member operatively connected to the spool is provided. A brake mechanism acts upon the brake member for slowing rotation of the spool. A line tension sensor is mounted in the reel frame for determining the tension of the fishing line and is operatively connected to the brake mechanism for engaging the mechanism with the brake member when slack occurs in the fishing line. The line tension sensor includes a member having first and second ends and first and second side edges with the first and second ends being pivotally mounted on the second axis between the first and second side edges.

In an embodiment of this aspect of the invention, the line tension sensor comprises two mutually spaced parallel bars extending along the first and second side edges in parallel to the second axis, and two end pieces interconnecting the bars at the first and second ends. The line tension sensor is pivotally mounted to the reel-frame at the end pieces midway between the first and second edges for rotational movement about the second axis. The fishing line runs through the line tension sensor at the upper side of one of the bars and at the lower side of the other one of the bars. This embodiment is particularly advantageous in combination with a fishing line of a "super line", i. e., a spun line usually of kelvar; super lines are very flexible and have a low friction coefficient; As a result, the line tension sensor can then operate with large angular motion.

A further aspect the invention provides a fishing reel for retaining a fishing line comprising a reel-frame having first and second axes, a spool mounted in the reel-frame for rotation about the first axis and receiving the fishing line thereon and a brake member operatively connected to the spool. A brake mechanism acts upon the brake member for slowing rotation of the spool. A line tension sensor is mounted in the reel frame for determining the tension of the fishing line and is operatively connected to the brake mechanism for engaging the mechanism with the brake member when slack occurs in the fishing line. The line tension sensor includes a member having first and second ends and first and second side edges with the first and second ends being pivotally mounted on the second axis between the first and second side edges.

According to a still further aspect, the invention provides a fishing reel for retaining a fishing line comprising a reel-frame having a first axis, a spool mounted in the reel-frame for rotation about the first axis and receiving the fishing line thereon and a level line guide connected to the reel-frame for aligning the fishing line as it is paid out from and retrieved onto the spool. The fishing reel also includes a line tension sensor mounted in the reel frame and positioned relative to the line guide such that a portion of fishing line being paid out passes through the line tension sensor before passing through the line guide.

The pre-braking provided by the first, friction brake according to the present invention in many cases can be sufficient in order to eliminate the risk of backlash for example due to existing pulsating tension in the fishing line as a result of the inherent elasticity of the fishing line and/or due to the swaying of the fishing rod during the cast as a consequence of the fishing rod being tensioned under resilient bending in an initial phase of the cast. However, the wedge brake removes any imminent risk of backlash that would arise as a result of the pre-braking not being sufficient to stop the spool from spinning.

The brake mechanism provided in the fishing reel according to the invention is not intended to be a substitute for the manually adjustable brakes which are normally provided in reels, such as a friction brake, in order to provide some resistance against the rotation of the spool, and a centrifugal brake in order to prevent the spool from rotating too rapidly. On the contrary, the brake mechanism according to the present invention provides a complement of these brakes.

BRIEF DESCRIPTION OF THE DRAWINGS

At present preferred embodiments of the invention will be described in more detail below reference being made to the accompanying drawings in which.

DESCRIPTION OF THE PREFERRED EMBODIMENTS

Figure 2:
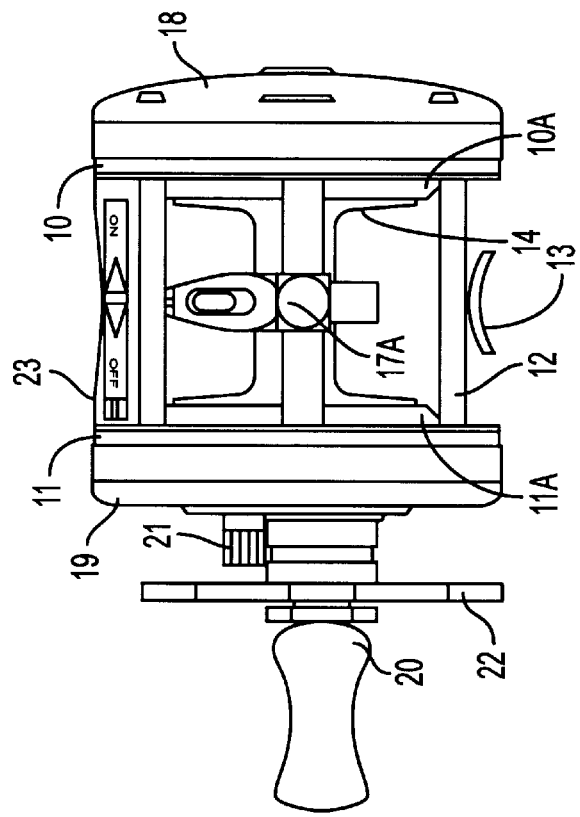
FIG. 2 is a side view of the reel in FIG. 1 as seen from the side where the fishing line runs out from the reel.
Figure 1:
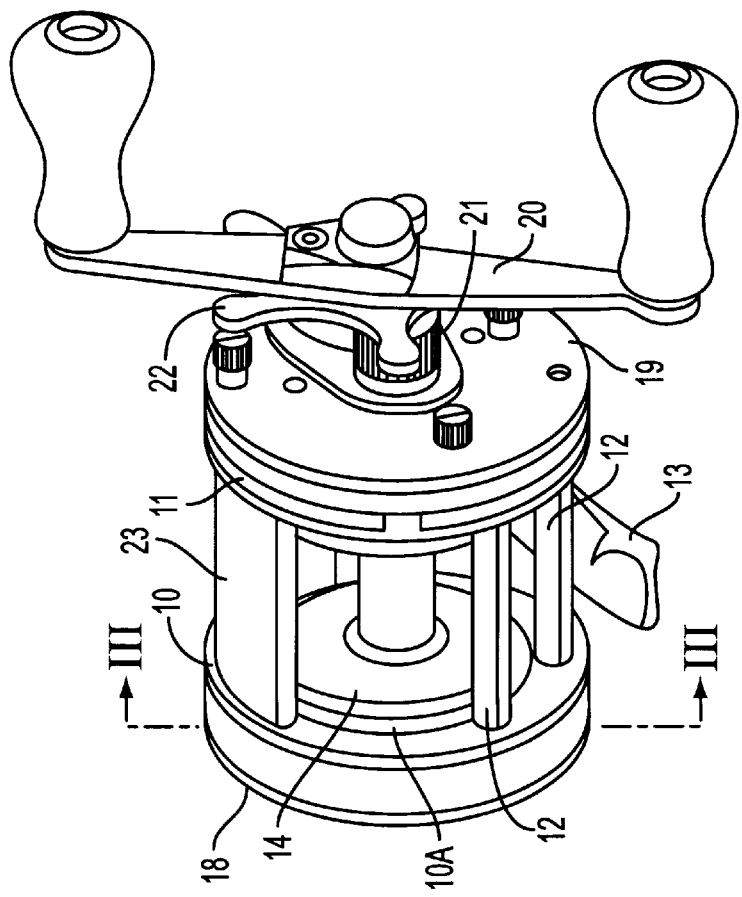
FIG. 1 is a perspective view of a reel according to the present invention.

Referring to FIGS. 1 and 2 the reel comprises two end plates 10 and 11 which are interconnected and are mutually spaced by means of a number, for example four, parallel rods 12 which are fixed by screw connection to the end plates and together with these form the frame of the reel. An elongated plate 13 is connected to two of the rods for mounting the reel to a fishing rod. A spool 14 is positioned between the end plates and is rotatably mounted in the plates. The spool has a shaft which passes coaxially therethrough and is fixedly attached to the spool, the shaft being shown at 15 in FIG. 3 (and the other corresponding figures). In the left end of the reel as seen in FIG. 1 the shaft is provided with a gear wheel 16 which engages a gear wheel indicated diagrammatically by a dot and dash line 17 in FIG. 3 and is rotatably mounted on the inside of a shield 18 mounted over end plate 10. Gear wheel 17 over a gear is connected with a conventional line guide, level wind, 17A in order to reciprocate the guide axially in parallel with the axis of the spool at the rotation thereof in order to align the fishing line as it is paid out from and retrieved onto the spool. Also end plate 11 on the outside thereof is provided with a shield 19 which in a conventional manner encloses a gear mechanism connecting shaft 15 with a crank 20 rotatably mounted in end plate 11, as well as a centrifugal brake and a friction brake which can be operated by means of adjusting elements 21 and 22, respectively.

Between the end plates a line tension sensor 23 is provided, which is fixedly connected to a shaft rotatably mounted in the end plates the shaft being parallel with the axis of the spool. This line tension sensor forms an operating member for the brake mechanism according to the invention and the construction and function thereof will be described in more detail below.

Figure 3:
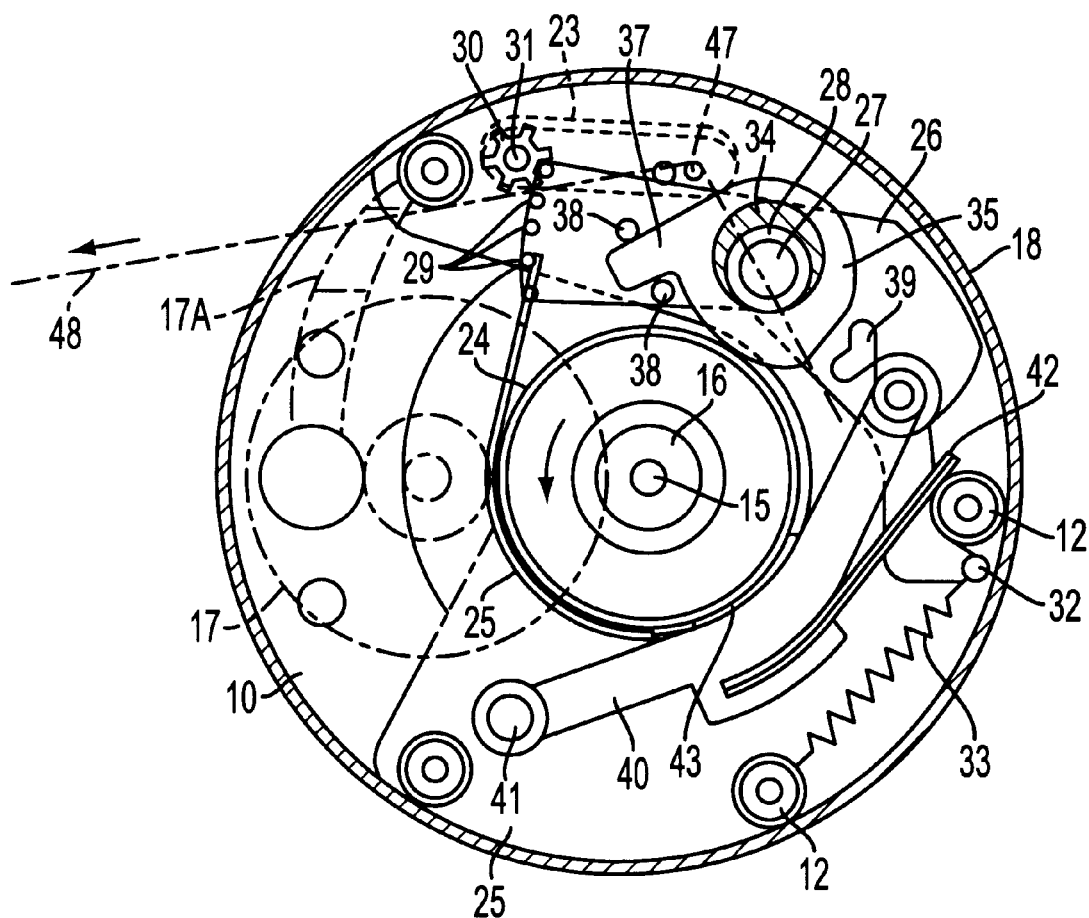
FIG. 3 is an end view of the left hand end plate of the reel, as seen from FIG. 2, a shield provided on the end plate being shown in cross-section along line III—III in FIG. 1, and the brake mechanism according to the invention located inside the shield is shown, in a first functional position.

Reference is now made to FIG. 3 in the drawings. A brake member shown as a brake drum 24 which is concentric with shaft 15 is fixedly mounted to the spool and projects at the outside of end plate 10. The brake mechanism includes first and second brakes. The first brake shall be engaged with the brake drum before the second brake and shall operate against the brake drum by frictional engagement therewith. The second brake, if thereafter engaged with the brake drum, operates against the brake drum by wedge engagement. When the spool is rotating to pay out the fishing line therefrom, the rotational direction of the spool is that indicated by an arrow in FIG. 3, i.e. counter-clockwise. The brake mechanism is mounted to a plate 25 which is fixedly mounted to the outside surface of the end plate 10 by means of the screw connection interconnecting the rods with the end plates. Plate 25 forms a rim 25' extending concentrically around the brake drum over part of the circumference thereof. A brake arm 26 of the second brake formed as a double-armed lever is pivotally mounted between the ends thereof on a pin 27 integral with plate 25 by means of a bearing bushing 28 integral with brake arm 26, see FIG. 7. At the left end of brake arm 26 a rack 29 formed by pins is provided engaging a gear wheel 30 attached to the shaft of the line tension sensor, the shaft being shown at 31 in FIG. 3. Instead of a rack formed by pins being provided the edge of brake arm 26 facing gear wheel 30, the teeth can be formed by other conventional manners. Between a pin 32 at the right hand end of brake arm 26 and the portion of one of rods 12 projecting from plate 25 a relatively weak helical spring 33 is provided which biases the right hand end of brake arm 26 which, as a consequence thereof, tends to swing counter-clockwise about pin 27.

Figure 7:
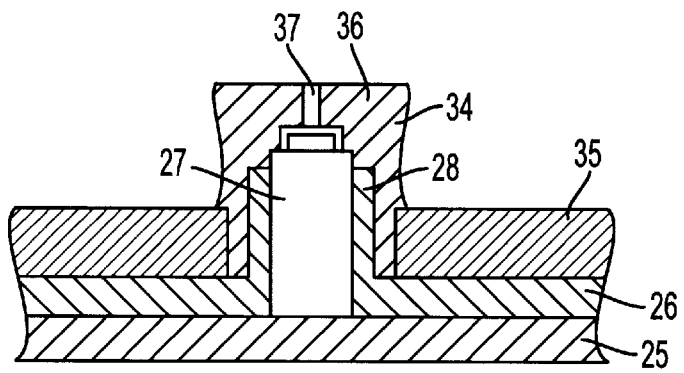
FIG. 7 is an enlarged axial sectional view of the bearing pin for the primary brake arm of the brake mechanism.

A socket 34 is rotatably mounted on bushing 28. This socket is eccentric at the outside surface thereof, and over the socket a brake shoe 35 is rotatably mounted which can consist of carbon or another friction material. FIG. 7 shows that socket 34, shown in section in FIG. 3, has the shape of a cap having an end wall 36 with an aperture 37 for passing a fastener such as a screw therethrough for securing into pin 27 in order to keep the elements mounted to the pin together, if needed.

Brake shoe 35 has a projection 37 which is displaceably received between two pins 38 on brake arm 26 in order that the brake shoe shall follow the swinging movement of the brake arm when rotated about pin 27. On the side of the brake shoe facing brake drum 24, the edge surface of the brake shoe has a radius which increases successively in the clock-wise direction of the brake drum, and the distance of this surface portion to the brake drum can be adjusted by turning the eccentric socket 34 which can be available through an aperture in shield 18 for manual adjustment.

A cam 39 is provided on brake arm 26 for co-operation with one end of a brake arm 40 of the first brake pivotally mounted on a pin 41 integral with plate 25. A spring blade 42 is attached to this brake arm and engages that portion of one of rods 12 which projects from end plate 10 and thus biases brake arm 40 to swing counter-clockwise against brake drum 24. The brake arm can engage brake drum 24 by brake lining 43 which is provided on the brake arm and can consist of carbon or another friction material.

Figure 3A:
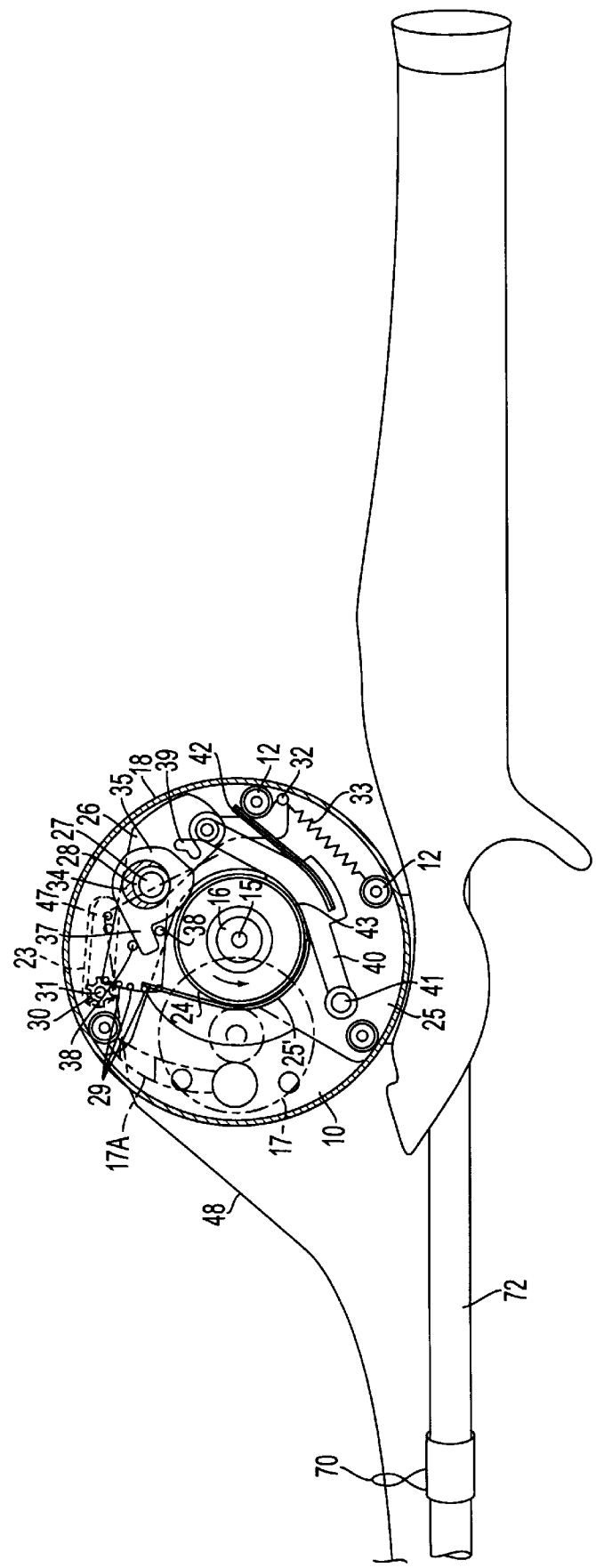
FIG. 3A is a side elevational view of the reel as seen in FIG. 3 secured to a fishing rod with the fishing line extending through the first line guide of the fishing rod.
Figure 8:
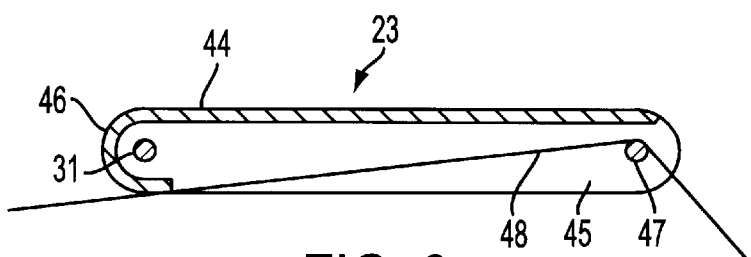
FIG. 8 is an enlarged cross-sectional view of a line tension sensor providing operating means for the brake mechanism of the invention.
Figure 9:
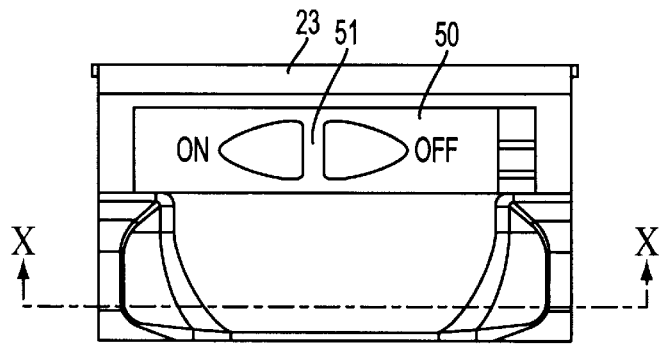
FIG. 9 is an enlarged plan view of the line tension sensor having a slide for switching the line tension sensor between operative and inoperative positions, the slide being shown in an ON-position corresponding to the operative position of the line tension sensor.
Figure 10:
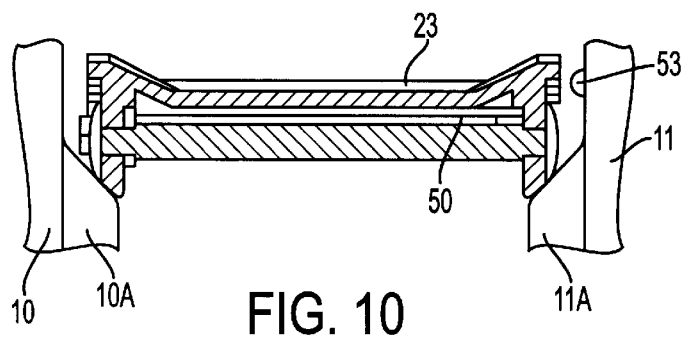
FIG. 10 is a cross sectional view along line X—X in FIG. 9, with the slide in the ON-position.
Figure 11:
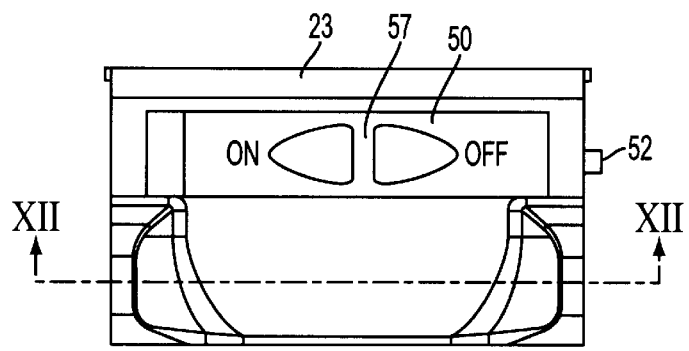
FIG. 11 is a view as in FIG. 9 with the slide shown in the OFF-position, corresponding to the inoperative position of the line tension sensor.
Figure 12:
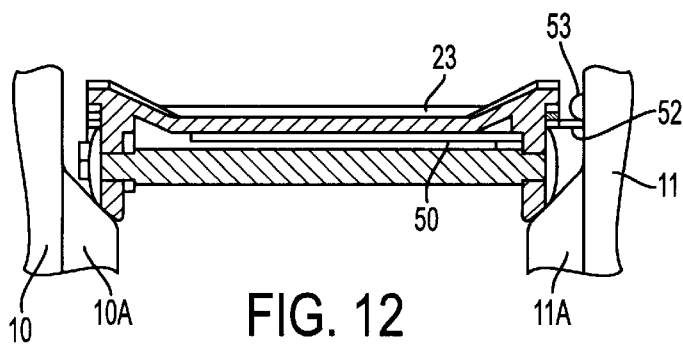
FIG. 12 is a view as in FIG. 10 along line XII—XII of FIG. 11 with the slide in the OFF-position.

Referring to FIG. 8 the line tension sensor comprises a plate 44 having end flanges one of which is shown at 45 in FIG. 8. Shaft 31 passes through the end flanges along one of the side edges of the line tension sensor and is attached to the flanges at the left side edge of the line tension sensor. In order that a safe connection shall be provided, the end flanges can have studs on the outside thereof through which the shaft passes and in which the attachment is provided. Plate 44 is bent around shaft 31 at the adjacent side edge 46 of the line tension sensor as is shown in FIG. 8. At the other side edge, the line tension sensor is provided with a bar 47 attached to end flanges 45, the bar being parallel with shaft 31. The fishing line is extended in operative co-operation with line tension sensor 23 as indicated in FIGS. 3 to 6 by a dot-and-dash line 48, and the fishing line is shown also in FIGS. 3A and 8 by a solid line having the same reference. As shown in FIG. 3A, the fishing line passes from the spool over bar 47 in order then to pass below portion 46 and from there via line guide 17A to the first eye 70 on the fishing rod 72. The portion shall have a gently rounded edge in order not to damage the fishing line. Regarding the arrangement of line tension sensor 23 in this embodiment it should be particularly noted that it has the free end thereof where bar 47 is provided directed against the rotational direction of the spool when the fishing line is paid out from the spool (counter-clockwise).

When the line tension sensor is in the position shown in FIGS. 3 and 8, which can be determined by the free end of the sensor being held by the taut fishing line against abutments on end plates 10 and 11 such as circular shoulders formed by the side plates as shown at 10A and 11A, FIGS. 1 and 2, brake lining 43 and brake shoe 35 are not engaged with brake drum 43; the brake mechanism is inoperative.

When line tension sensor 23 is swung counter-clockwise, a swinging movement in the clockwise direction will be imparted to brake arm 26 via gear wheel 30 and rack 29. Movement of brake arm 26 in the clockwise direction causes brake shoe 35 to move against brake drum 24. When swung clockwise, brake arm 26 successively releases brake arm 40 biased by spring blade 42 so that the arm under the pressure of spring blade 42 will be displaced towards brake drum 24 at the same time as brake shoe 35 is also displaced in this way. However, according to the invention, the operative connection between brake arms 26 and 40 should be such that brake lining 43 when the line tension sensor is being swung counter-clockwise will be engaged with brake drum 24 before engagement of brake shoe 35, which can be achieved by giving cam 39 a suitable shape.

Brake arm 40 with brake lining 43 operates as a pure friction brake: the harder the brake lining is pressed against the brake drum, the heavier the resulting brake effect. Accordingly, a soft braking of the spool can be obtained by this brake function when the brake lining is lightly pressed against the brake drum. When initially engaged with the brake drum 24, brake shoe 35 will provide friction braking, but because of the shape of the brake shoe 35, this friction braking will only be momentary and will rapidly change over into a wedge engagement between brake shoe 35 and brake drum 24 so that the rotation of the brake drum will be stopped abruptly. Brake arm 40 with brake lining 43 thus operates as a frictional, pre-brake when the line tension sensor is swung counter-clockwise while brake arm 26 with brake shoe 35 operate as an emergency, wedge brake which will not be operative until an initial pre-braking has taken place.

If the fishing line is taut, as it runs out from the reel the line tension sensor will take the position according to FIG. 3 because the right hand end of the line tension sensor as shown in FIG. 3 will be held depressed by the taut fishing line at bar 47 and thus will be prevented from swinging counter-clockwise about shaft 31. Therefore, the spool can rotate freely in the counter-clockwise direction, and as long as this condition prevails nothing happens with the brake mechanism which will remain inoperative. Should the fishing line for some reason slack, the line "lifts", while the spool is rotating in the pay out direction, the line sensor will activate the brake mechanism as discussed below and the occurrence of a great number of loose windings on the spool which can easily become tangled will be prevented. As discussed above, this occurrence is often referred to as "backlash".

When the fishing line is slacking, the line tension sensor will be swung counter-clockwise from the position shown in FIG. 3. The gap between brake lining 43 and brake drum 24 and the gap between brake shoe 35 and brake drum 24 should be dimensioned such that at the very initial slacking of the line, the brake mechanism will not be actuated immediately via line tension sensor 23 to initiate braking of spool 14 via brake lining 43. According to the invention it has been found that lining 43 should be spaced from brake drum 24 such that the initial swinging of the line tension sensor counter-clockwise over an angle of the order of 200 can provide an idle distance. The line tension sensor then has reached substantially the position disclosed in FIG. 4 and in this position brake lining 43 has come into light contact with brake drum 24 while brake shoe 35 is still lifted therefrom.

If the fishing line then continues to lift, line tension sensor 23 will continue to swing counter-clockwise with friction lining 43 being still more powerfully engaged with the brake drum at friction lining 43. As a consequence thereof, the spool will be retarded while brake shoe 35 has not yet contacted the brake drum during swinging of the line tension sensor from the position in FIG. 4 to the position in FIG. 5. According to the invention it has been found that the angle between these two positions of the line tension sensor preferably is of the order of 60°. During this swinging movement of the line tension sensor a gentle braking of the spool takes place, and as a consequence thereof the slack of the fishing line may disappear and the fishing line will again be taut so that the line tension sensor will be returned to the position in FIG. 4 or will approach the position in FIG. 3 and the spool can again rotate freely without being impeded by the brake mechanism.

Figure 5:
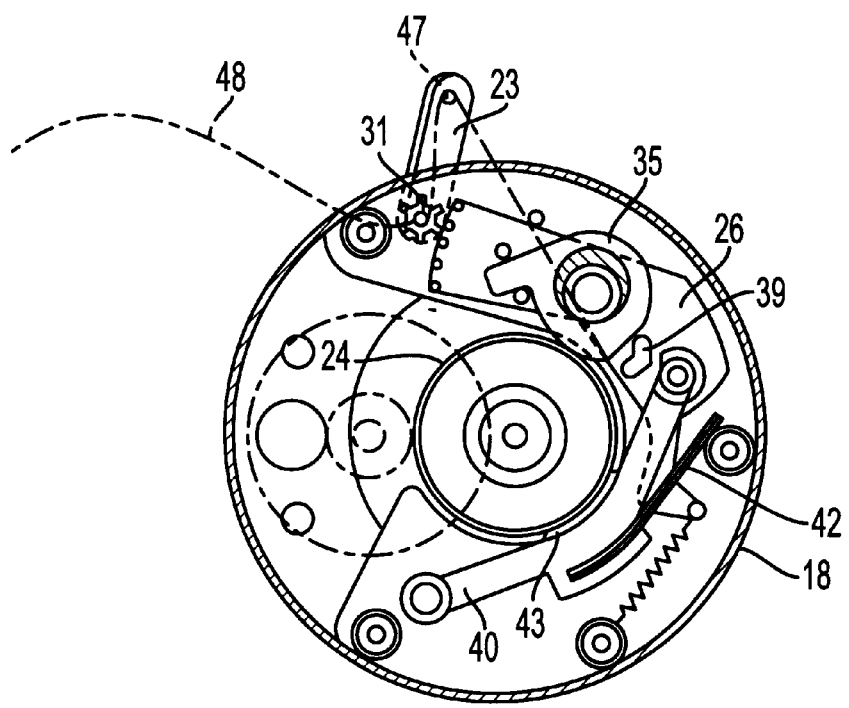
Figure 6:
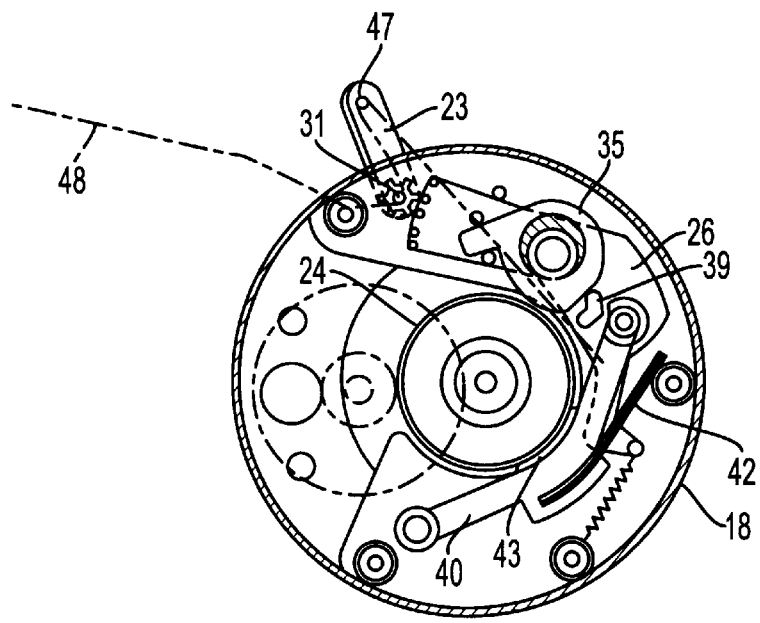

If however the slack of the fishing line increases successively and line tension sensor 23 as a consequence thereof continues to swing counter-clockwise from the position in FIG. 5 towards the position in FIG. 6 which is an end position for the line tension sensor and is defined by a suitable abutment which can be formed by one of rods 12, brake shoe 35 will be engaged with the brake drum 24. Initially there will be a light friction engagement between brake shoe 35 and brake drum 24 but, essentially immediately thereafter, the friction force will be so great that the brake shoe 35 will be carried along by the brake drum 24 and due to the manner in which the brake shoe 35 is shaped, it will be wedged against the brake drum 24. As a consequence thereof the drum 24 and thus the spool will be abruptly stopped in the position according to FIG. 6. The swinging range of the line tension sensor 23 between the position in FIG. 5 and the position in FIG. 6 is suitably about 30°.

The spool will not always undergo pre-braking before being abruptly stopped, as discussed above. If the fishing line during a cast for some reason is stopped abruptly, the fishing line will very rapidly slack and the position according to FIG. 6 will be achieved practically momentarily. The brake shoe accordingly operates as an emergency brake. In this respect the brake mechanism according to the invention is intelligent as it senses by means of the line tension sensor the existing need for braking and adjusts the braking effect in accordance therewith.

During fishing, a pulsating tension can arise in the fishing line while casting due to sway in the fishing rod and elasticity in the fishing line and this may lead to varying slack in the fishing line. The brake mechanism according to the invention is well suited to compensate for this by the pre-braking initiated as soon as there is even a very small amount of slack in the fishing line beyond the initial slack discussed above.

During some types of fishing, the lure is dropped into the water and the fishing line is allowed to unwind until the lure strikes against the bottom. Then, the spool is locked and the lure is lifted about half a meter from the bottom. At this maneuver the brake mechanism according to the invention considerably facilitates the positioning of the lure by automatically effecting abrupt braking of the spool when the lure strikes against the bottom.

The individual angler for one reason or the other may want to make the brake mechanism described inoperative, and in order that this can be done a lock according to FIGS. 9 to 12 has been developed. Referring to FIG. 2 and FIGS. 9 to 12 a slide 50 is displaceably mounted to the line tension sensor 23 to be switched between the position in FIGS. 2, 9, and 10 which is an ON-position, wherein the line tension sensor 23 is free to swing in dependence of the tension in the fishing line as illustrated in FIGS. 3 to 6, and thus to operate the brake mechanism to the extent necessary in order to prevent backlash. The slide 50 includes a small finger grip 51 on the upper side thereof for the manual operation of the slide when switching between the ON-position in FIGS. 2, 9 and 10 and an OFF-position shown in FIGS. 11 and 12. In the OFF-position slide 50 projects at one side of the line tension sensor at 52 and engages behind a boss 53 formed on end plate 11, so that the line tension sensor is arrested in the position disclosed in FIGS. 1, 2, and 3 and thus cannot swing in dependence of the tension in the fishing line. Accordingly, the fishing reel with the line tension in the arrested position operates without the backlash preventing function described above and provides a thumb rest for the fisherman.

Boss 53 can be replaced by an aperture in end plate 11 the slide being shaped to engage into the aperture at slide projection 52 in the OFF-position of the slide.

Figure 20:
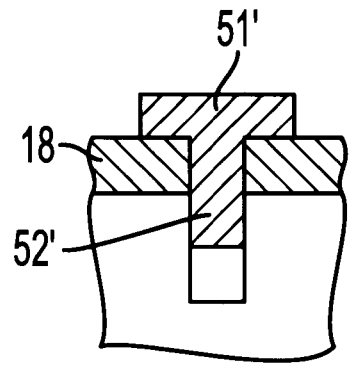
FIG. 20 is an enlarged cross-sectional view through the circumferential edge flange of the shield and a lock slide displaceably mounted therein along line XX—XX of FIG. 19.
Figure 21:
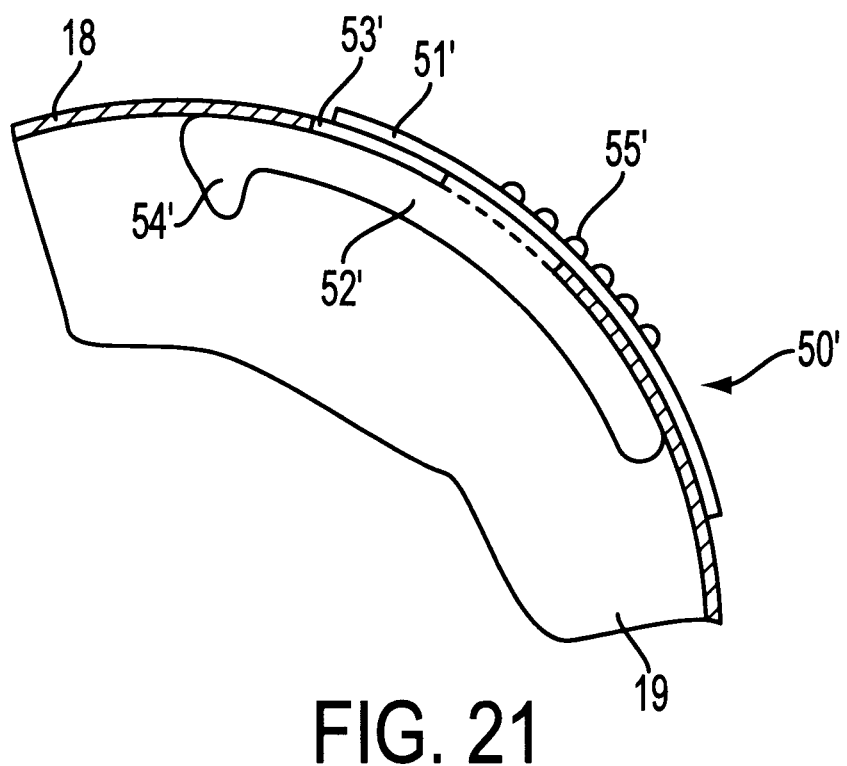
FIG. 21 is a side view of the lock slide in disengaged position with the edge flange of the shield shown in cross section.

Another lock according to the present invention is shown in FIGS. 18 to 21 to make the brake mechanism described inoperative. On brake arm 26 a pin 49 is provided for co-operation with a displaceable slide 50' provided on the edge flange of shield 18. The slide has a T-shaped cross-section as shown in FIG. 20. The transverse portion 51' is located on the outside surface of the edge flange of the shield while the trunk portion 52' extends through a slot 53' in the edge flange. Slot 53' has an insignificantly larger width than portion 52'. Portion 52' is slotted from both ends in order to receive in the slots the edge flange. The non-slotted part of portion 52' has a shorter length than slot 53' in the edge flange so that the slide can be displaced between two end positions in the slot. Portion 52' forms at the base thereof a projection 54' which in one position, FIG. 18, engages pin 49 and keeps line tension sensor 23 in the position according to FIG. 2, thereby preventing the line tension sensor from swinging upwards and providing a thumb rest for the user as discussed below. With the slide in this position, the brake mechanism cannot be engaged with the brake drum and is completely inoperative. By displacing the slide to the other end position, FIG. 19, the projection is disengaged from the pin and is now free to swing counter-clockwise for engaging the brake mechanism.

The slide can be made of plastic and can be resiliently flexible and it has at the upper side surface thereof ribs 55' facilitating the manual displacement. The tab of portion 52' defined by slotting at the right hand end of the slide, FIG. 21, has such a length that it can be passed through slot 53' when the slide is passed through the slot at the tab which is defined at the opposite end of the slide where projection 54' is provided, in order that the slide can be mounted and dismounted.

In a modification of the fishing reel described, the brake member connected to the spool comprises a brake disk and the brake mechanism operatively connected with the line tension sensor is modified for cooperation with the brake disk while applying the method of braking the spool in accordance with the invention.

The line tension sensor 23 in the embodiment of the invention described above, which is disposed relative to level line guide 17A such that the fishing line when paid out from the spool passes through the line tension sensor before it passes through the line guide is advantageous because it integrates the sensor with a thumb rest. When the fishing line is retrieved on the spool, the angler when holding the fishing rod and rotating the spool at crank 20 can have the thumb of the hand holding the fishing rod resting on the line tension sensor which is held in the position shown in FIGS. 1, 2 and 3 engaging abutments 10' and 11'. Thus the sensor function is added to the fishing reel without making the look thereof much different than a conventional fishing reel with a conventional thumb rest thereon. The location of the sensor according to the present invention is more aesthetically appealing then that of the prior art.

FIGS. 13 to 16 illustrate another embodiment of the line tension sensor. The same references have been used for elements corresponding to elements in the embodiment described above. The brake mechanism shown is of simplified construction and is mounted to end plate 11. Brake arm 26 forms a brake shoe 56 which can be engaged with brake drum 24 and is biased to such engagement by a helical tension spring 57 extending between the brake arm and a pin 12' forming an axial extension of one of the rods 12.

A line tension sensor 23' in this embodiment includes two cylindrical bars 58A and 58B spaced from each other and extending parallel to one another and shaft 15 thus forming the side edges of the sensor. The bars are connected at their ends to two end pieces 59 extending perpendicularly to the bars and forming the ends of the sensor. By way of pivots, one of them being shown at 60, the end pieces 59 are rotatably mounted in end plates 10 and 11 for rotation about an axis extending in parallel with the bars 58A and 58B which are evenly spaced on either side thereof. The axis and bars 58A, 58B are parallel to the rotational axis of spool 14. Gear wheel 30 is fixedly connected to the pivot 60 mounted in end plate 11 and engages rack 31 on brake arm 26.

Figure 13:
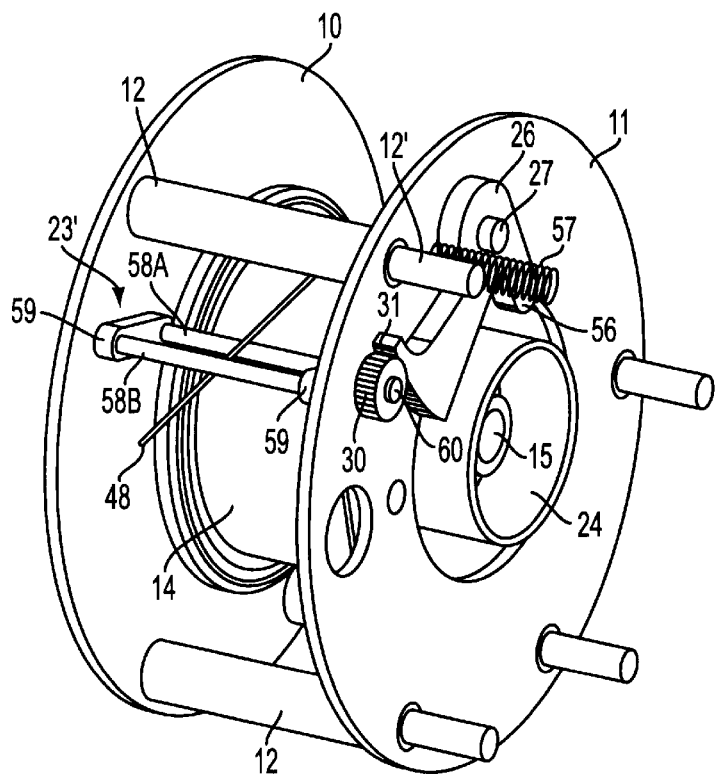
FIG. 13 is a perspective view of a fishing reel illustrating a second embodiment of the line tension sensor, a brake mechanism of simplified construction being shown in a disengaged position.
Figure 14:
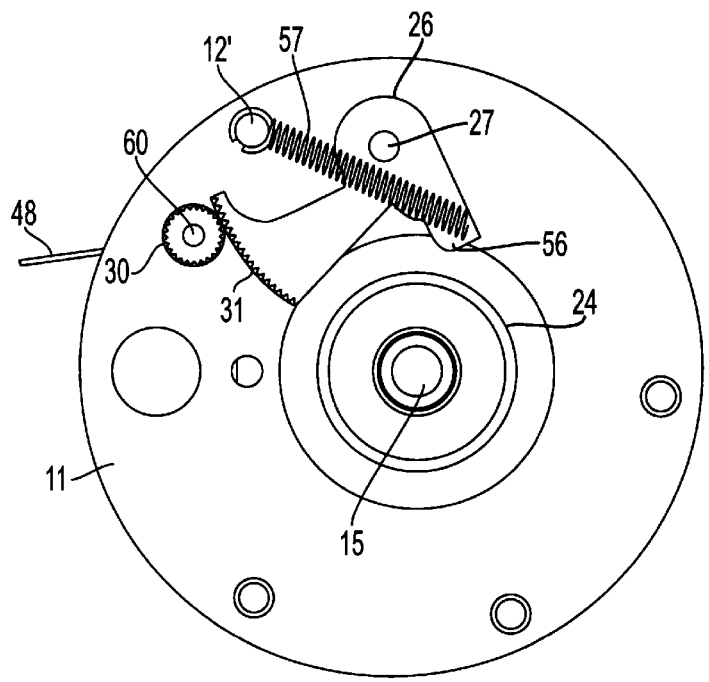
FIG. 14 is an end view of the fishing reel of FIG. 13 with the brake in disengaged position.

As shown in FIG. 13, fishing line 48 received on spool 14 extends from the spool through the line tension sensor at the upper side of bar 58A and at the lower side of bar 58B. The fishing line is taut which means that it is payed out from the spool under normal conditions. When the line tension sensor is kept in the position disclosed in FIG. 13 by the taut fishing line, brake arm 26 is maintained in the position shown in FIGS. 13 and 14 against the bias of spring 57 so that brake shoe 56 is disengaged from brake drum 24 and spool 14 can rotate freely.

Figure 15:
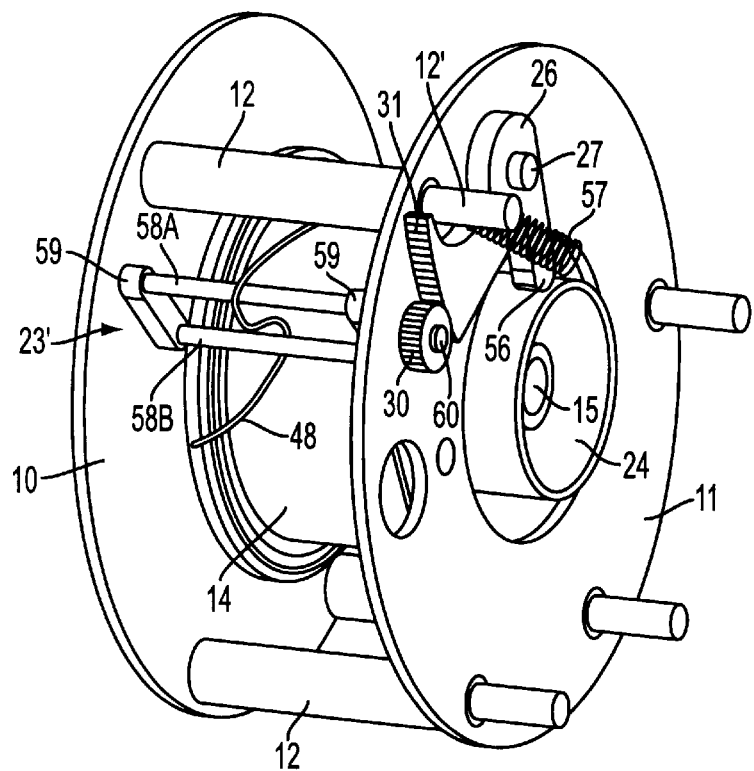
FIGS. 15 and 16 are views as in FIGS. 13 and 14 but showing the brake mechanism in the engaged position.
Figure 16:
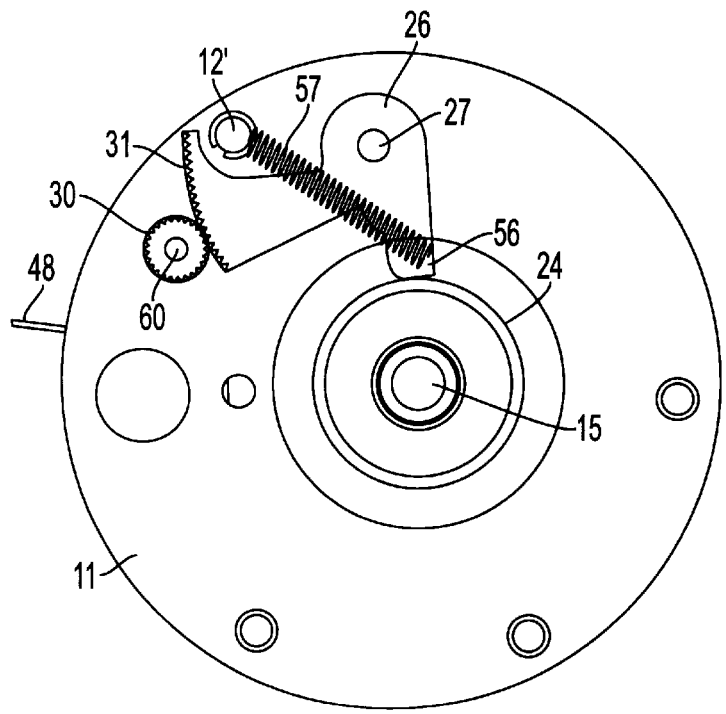

If fishing line 48 slacks, the situation illustrated in FIGS. 15 and 16 will arise. The fishing line will be bent over bars 58A and 58B as shown in FIG. 15. If the fishing line consists of a super line, i. e., a spun line which substantially lacks stiffness and has a low friction coefficient, the portion of the fishing line passing through the line tension sensor will be substantially S-shaped. When the fishing line is slacking the line tension sensor 23' under the bias of spring 57 will rotate counter-clockwise as seen in FIGS. 15 and 16 and brake arm 26 will rotate clockwise so that brake shoe 56 will be engaged with brake drum 24. The rotation of spool 14 will be retarded and the risk of backlash being eliminated or substantially reduced. When fishing line 48 is again taut, line tension sensor 23' will rotate clockwise and brake arm 26 will rotate counter-clockwise so that brake shoe 56 will be disengaged from brake drum 24.

The line tension sensor 23' described with reference to FIGS. 13 to 16 is particularly useful in combination with a super line due to the softness and flexibility of the super line. The use of a super line moves the rotational movement of the sensor when the fishing line experiences slack is greater than it would be with a monofilament line. As a result, the operation of the brake mechanism will be more accurate particularly if the mechanism is of the type effecting initial friction braking and then wedge braking.

Line tension sensor 23' described with reference to FIGS. 13 to 16 can be modified. For example, the two bars 58A and 58B and the two end pieces 59 can integrally form a rectangular frame which can be made of a wire bent to the required rectangular shape. The sensor can also be formed by casting metals or plastics. The casted sensor could include the pivots 60 as integral parts thereof. The sensor including the pivots also can comprise a stamped metal sheet wherein the portion of the frame corresponding to bar 58A forms a convex upper side and the portion of the frame corresponding to bar 58B forms a convex lower side, as would be seen in cross section, both portions would have rounded edges.

Figure 17:
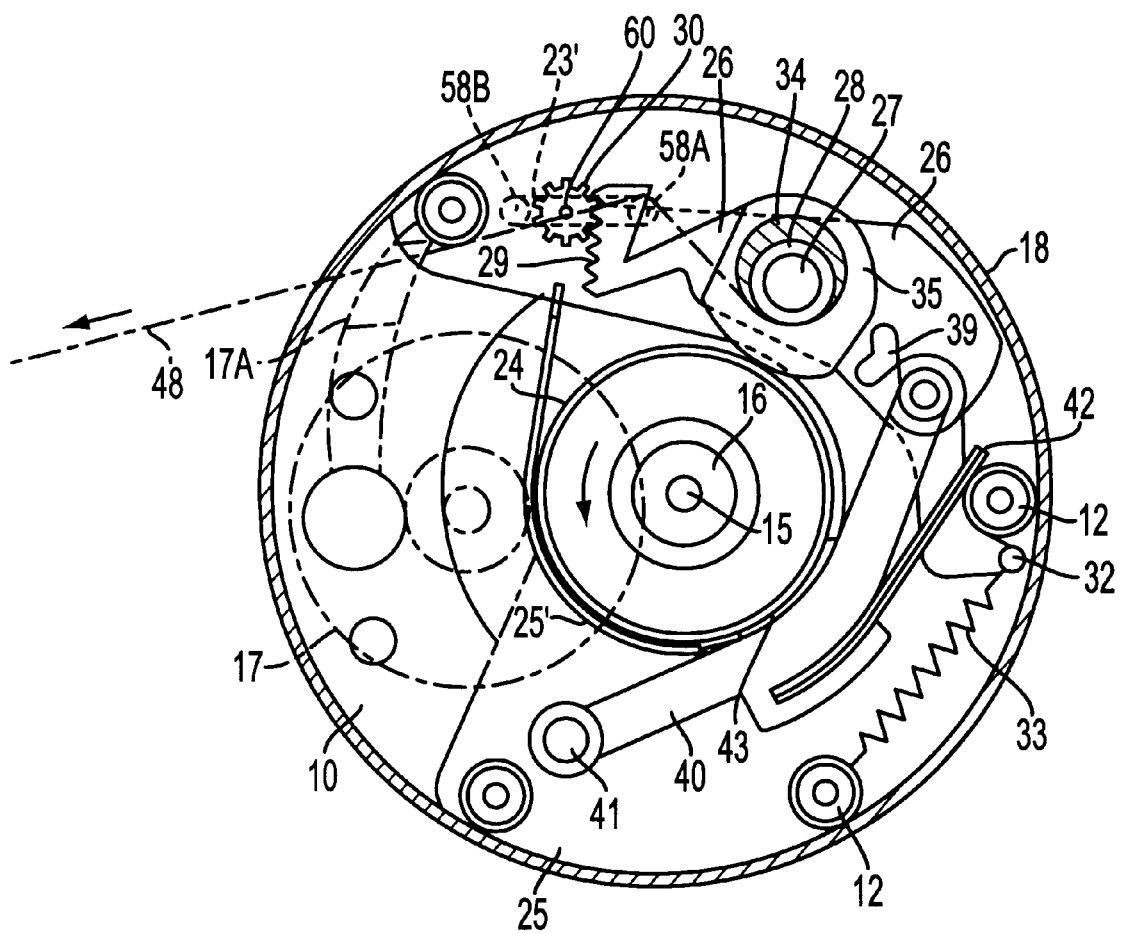
FIG. 17 is a view as in FIG. 3 showing the line tension detector of FIGS. 13 to 16 operatively connected with the brake mechanism of FIGS. 3 to 6.
Figure 18:
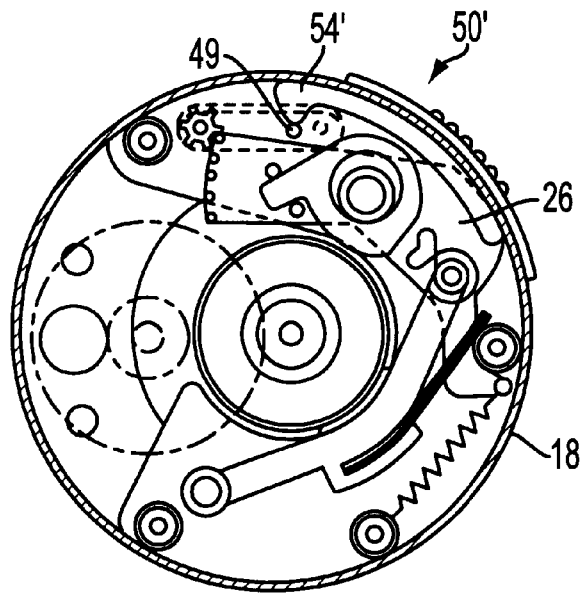
FIG. 18 is an end view similar to that in FIG. 3 but in reduced scale and shows the brake mechanism with operating means for switching the brake mechanism on and off; the mechanism being shown in the switched off position.
Figure 19:
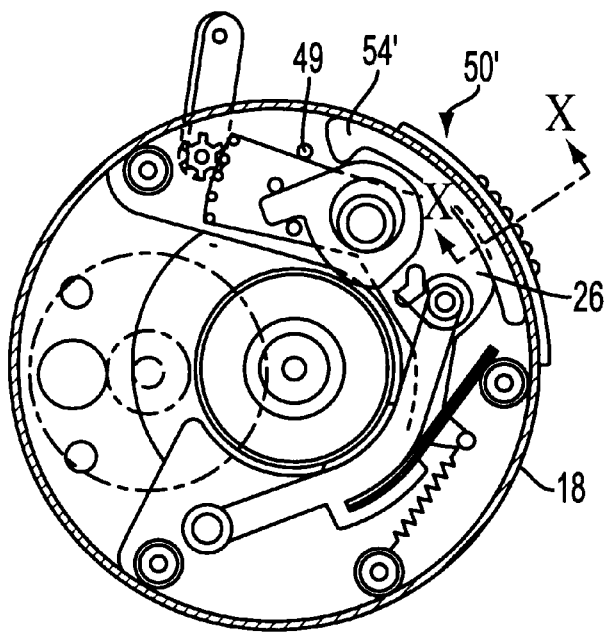
FIG. 19 is a corresponding view as that in FIG. 18 with the brake mechanism in the switched on position.

As will be understood line tension sensor 23' of FIGS. 13 to 16 can be operatively connected with the brake mechanism described above with reference to FIGS. 1 to 12, and this is disclosed in FIG. 17. Gear wheel 30 mounted to shaft 60 of line tension sensor 23' engages rack 29 formed by the edge of brake arm 26 which in this case has no pins 38. Brake shoe 35 can instead be guided on brake arm 26 by a pin on the brake shoe engaging a slot in the brake arm so that the brake shoe is non-rotatably mounted on the brake arm but can be displaced towards and away from brake drum 24 by the eccentric as described above. Fishing line 48 passes over rod 58A and below rod 58B of line tension sensor 23' in the manner disclosed in FIGS. 13 and 15. The sensor is shown in the same operative position in FIG. 17 as in FIG. 13 and is held in this position by the taut fishing line; the brake mechanism is inoperative and is in the same position as shown in FIG. 3.

Figure 4:
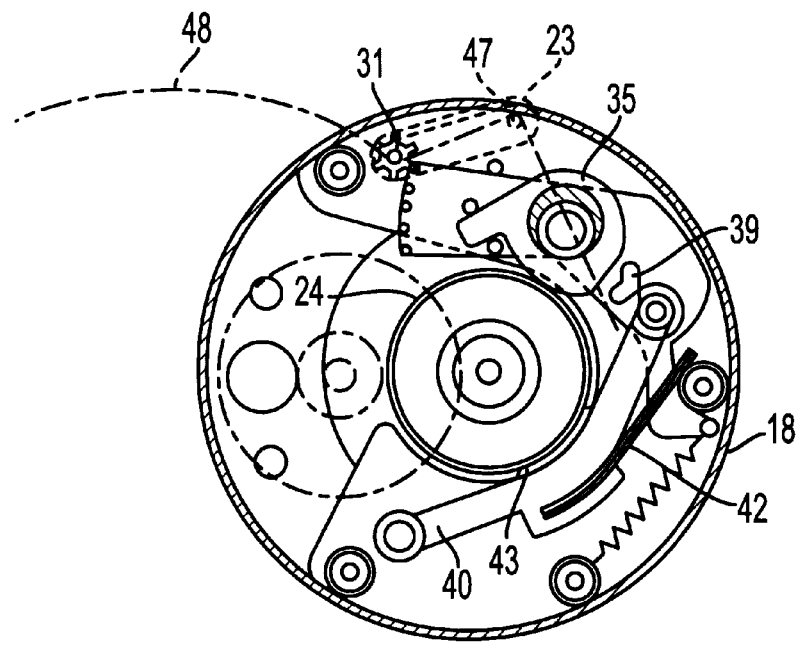
FIGS. 4, 5 and 6 are corresponding views as FIG. 3 but in reduced scale and show the brake mechanism in three other functional positions.

If the fishing line is slacking, line tension sensor 23' will rotate counter-clockwise (as in FIG. 15) and the brake mechanism will take the position of FIG. 4 or 5 and eventually the position of FIG. 6, if the braking effected by the brake mechanism in the position of FIG. 5 will not prevent further slacking of the fishing line. The function of the brake mechanism is the same when operatively connected with line tension sensor 23' (FIGS. 13 to 16) as when operatively connected with line tension sensor 23 (FIGS. 1 to 6).

While specific embodiments of the invention have been described in detail above, it is to be understood that various further modifications may be made from specific details described without departing from the spirit and scope of the invention.

What is claimed is:

1. A fishing reel for retaining a fishing line comprising:
   a. a reel-frame having a first axis;
   b. a spool mounted in the reel-frame for rotation about the first axis and receiving the fishing line thereon,
   c. a brake member coupled to the spool;
   d. a brake mechanism acting upon the brake member for slowing rotation of the spool, the brake mechanism including a first brake for engaging the brake member and pre-braking the spool after initial slack occurs in the fishing line, and a second brake for engaging the brake member and abruptly stopping the spool after a predetermined amount of slack beyond the initial slack occurs in the fishing line; and
   e. a line tension sensor mounted in the reel frame for determining the tension of the fishing line and coupled to the brake mechanism for engaging the first and second brakes with the brake member after slack is sensed in the fishing line.

2. The fishing reel according to claim 1 wherein said first brake includes a friction brake and said second brake includes a wedge brake, both said brakes being capable of engaging said brake member; and said wedge brake is connected with said friction brake such that movement of said wedge brake initiates movement of said friction brake toward said brake member.

3. The fishing reel according to claim 2 wherein said line tension sensor is pivotally mounted to said reel-frame; and said wedge brake is connected with said line tension sensor to be engaged with said brake member by pivotal movement of said line tension sensor when slack occurs in the fishing line.

4. The fishing reel according to claim 3 wherein said friction brake is spring biased toward said brake member.

5. The fishing reel according to claim 4 wherein said fishing reel further comprises a cam mechanism coupling said wedge brake to said friction brake to hold said friction brake against the spring bias and release said friction brake when said wedge brake moves toward said brake member.

6. The fishing reel according to claim 5 wherein said wedge brake is spring biased to swing away from said brake member.

7. The fishing reel according to claim 6 wherein said fishing reel includes a second axis; said line tension sensor comprises a member having first and second side edges, said first side edge being pivotally mounted on said second axis and said second side edge moving relative to said reel frame; and said second side edge is positioned for receiving said fishing line over a portion thereof so that said second side edge will be held down when said fishing line is taut.

8. The fishing reel according to claim 7 wherein said line tension sensor is connected with said wedge brake such that said second side edge of said line tension sensor swings upward away from said reel-frame.

9. The fishing reel according to claim 8 wherein said first side edge of said line tension sensor is coupled with said wedge brake for transmission of movement of said line tension sensor to said wedge brake.

10. The fishing reel according to claim 9 wherein said line tension sensor includes a shaft; and said shaft is coupled to a pivoting end of said wedge brake.

11. The fishing reel according to claim 6 wherein said reel frame includes a second axis; and said line tension sensor includes a member having first and second ends and first and second side edges with said first and second ends being pivotally mounted on said second axis.

12. The fishing reel according to claim 11 wherein said second axis is located midway between said first and second side edges.

13. The fishing reel according to claim 11 wherein said line tension sensor comprises two mutually spaced parallel bars extending along said first and second side edges in parallel to said second axis, and two end pieces interconnecting said bars at said first and second ends; and said fishing reel further comprises means pivotally connecting said line tension sensor to said reel-frame at said end pieces for pivoting movement about said second axis.

14. The fishing reel according to claim 13 wherein said connecting means of said line tension sensor is coupled to said wedge brake for transmission of movement of said line tension sensor to said wedge brake.

15. The fishing reel according to claim 13 wherein said reel further includes a fishing line retained on said spool; and said fishing line runs through said line tension sensor at said upper side of one of said bars and at said lower side of the other one of said bars.

16. The fishing reel according to claim 6 wherein said wedge brake includes a brake shoe; and said reel further comprises an eccentric for adjusting the distance between said brake shoe and said brake member.

17. The fishing reel according to claim 1 further comprising a plate mounting said brake mechanism, said plate being secured to said reel-frame.

18. The fishing reel according to claim 1 further comprising a manually operable member for uncoupling said line tension sensor from said brake mechanism to render said brake mechanism inoperative.

19. The fishing reel according to claim 1 wherein said fishing reel further comprises a line guide connected to said reel-frame for aligning the fishing line as it is paid out from and retrieved onto said spool; and wherein said line tension sensor is positioned relative to said line guide such that a portion of fishing line being paid out passes through said line tension sensor before passing through said line guide of said reel.

20. A fishing reel for retaining a fishing line comprising:
a. a reel-frame having first and second axes;
b. a spool mounted in said reel-frame for rotation about said first axis and receiving the fishing line thereon;
c. a brake member coupled to said spool;
d. a brake mechanism acting upon said brake member for slowing rotation of said spool; and
e. a line tension sensor mounted in said reel frame for determining the tension of the fishing line and coupled to said brake mechanism for engaging said mechanism with said brake member after slack initially occurs in the fishing line, said line tension sensor including a member having first and second ends and first and second side edges with said first and second ends being pivotally mounted on said second axis between said first and second side edges, and wherein one of said line tension sensor and said brake mechanism includes a gear for coupling with other of said line tension sensor and said brake mechanism,
said line tension sensor comprising two mutually spaced parallel bars extending along said first and second side edges in parallel to said second axis, and two end pieces interconnecting said bars at said first and second ends; and wherein said fishing reel further comprising means pivotally connecting said line tension sensor to said reel-frame at said end pieces midway between said first and second edges for rotational movement about said second axis.

21. The fishing reel according to claim 20 wherein said reel includes a fishing line retained on said spool; wherein said line tension sensor includes two spaced bars, and said fishing line runs through said line tension sensor at an upper side of one of said two spaced bars and at said lower side of the other one of said two spaced bars.

22. A fishing reel for retaining a fishing line comprising:
a. a reel-frame having first and second axes;
b. a spool mounted in said reel-frame for rotation about said first axis and receiving the fishing line thereon;
c. a brake member coupled to said spool;
d. a brake mechanism acting upon said brake member for slowing rotation of said spool; and
e. a line tension sensor mounted in said reel frame for determining the tension of the fishing line and coupled to said brake mechanism for engaging said mechanism with said brake member after slack initially occurs in the fishing line, said line tension sensor including a member having first and second ends and first and second side edges with said first and second ends being pivotally mounted on said second axis between said first and second side edges, said line tension sensor comprises two mutually spaced parallel bars extending along said first and second side edges in parallel to said second axis, and two end pieces interconnecting said bars at said first and second ends; and wherein said fishing reel further comprises means pivotally connecting said line tension sensor to said reel-frame at said end pieces midway between said first and second edges for rotational movement about said second axis, and said line tension sensor being coupled to said brake mechanism for transmission of movement of said line tension sensor to said brake mechanism through a gear coupled to one of said line tension sensor and said brake mechanism.

23. The fishing reel according to claim 22 wherein said brake mechanism is spring biased to engage said brake member; and said bars are held under pressure against the fishing line by said spring bias.

24. The fishing reel according to claim 23 wherein said bars are cylindrical.

25. A fishing reel for retaining a fishing line comprising:
a. a reel-frame having a first axis and a second axis;
b. a spool mounted to said reel-frame for rotation about said first axis and receiving the fishing line thereon;
c. a line guide connected to said reel-frame for aligning said fishing line as it is paid out from and retrieved onto said spool; and
d. a line tension sensor mounted in said reel frame and positioned relative to said line guide such that a portion of fishing line being paid out passes through said line tension sensor before passing through said line guide and said line tension sensor including a member having first and second side edges with said first side edge of said line tension sensor being pivotally mounted on said second axis and being located proximate said line guide.

26. The fishing reel according to claim 25 wherein said line tension sensor includes a switch for activating and deactivating a brake mechanism.

27. A fishing reel for retaining a fishing line comprising:
a. a reel-frame having a first axis;
b. a spool mounted to said reel-frame for rotation about said first axis and receiving the fishing line thereon;
c. a line guide connected to said reel-frame for aligning said fishing line as it is paid out from and retrieved onto said spool; and
d. a line tension sensor mounted in said reel frame and positioned relative to said line guide such that a portion of fishing line being paid out passes through said line tension sensor before passing through said line guide
said line tension sensor includes a member having first and second ends and first and second side edges with one of said first and second side edges being pivotally mounted on said second axis, and
said first side edge of said line tension sensor being pivotally mounted on said second axis and being located proximate said line guide.

28. The fishing reel according to claim 27 wherein said line tension sensor includes a member extending between said first and second ends.

29. The fishing reel according to claim 27 wherein said line tension sensor includes a plate following a contour of said reel-frame when said plate is in a deactivated position.

30. The fishing reel according to claim 29 wherein said sensor plate pivots about said second axis.

31. The fishing reel according to claim 30 wherein said sensor plate pivots into an initial predetermined position when slack is sensed in the fishing line.

32. The fishing reel according to claim 30 wherein said reel-frame includes first and second side plates; and said sensor plate is positioned between said side plates.

33. A fishing reel retaining a fishing line comprising:
   a. a reel-fame having a fist axis and a second axis;
   b. a spool mounted in said reel-frame for rotation about said first axis and receiving the fishing line thereon;
   c. a line guide connected to said reel-frame for aligning said fishing line as it is paid out from and retrieved onto said spool;
   d. a brake mechanism for said spool; and
   e. a line tension sensor pivotally connected to said reel-frame for sensing slack in the fishing line and positioned relative to said line guide such that a portion of fishing line being paid out passes through said line tension sensor before passing through said line guide, and said sensor pivoting into a predetermined initial position for activating said brake mechanism when slack in the fishing line is sensed and said line tension sensor including a member having first and second side edges with said first side edge of said line tension sensor being pivotally mounted on said second axis and being located proximate said line guide.

34. The fishing reel according to claim 33 wherein
said line tension sensor includes a plate and follows a contour of said reel-frame when in a deactivated position.

35. The fishing reel according to claim 33 wherein said line tension sensor includes a switch for activating and deactivating said brake mechanism.

36. A fishing reel for retaining a fishing line comprising:
   a. a reel-frame having a first axis;
   b. a spool mounted in said reel-frame for rotation about said first axis and receiving the fishing line thereon;
   c. a line guide connected to said reel-frame for aligning said fishing line as it is paid out from and retrieved onto said spool;
   d. a brake mechanism for said spool; and
   e. a line tension sensor pivotally connected to said reel-frame for sensing slack in the fishing line and positioned relative to said line guide such that a portion of fishing line being paid out passes through said line tension sensor before passing through said line guide, and said sensor pivoting into a predetermined initial position for activating said brake mechanism when slack in the fishing line is sensed,
   said line tension sensor includes a member having first and second ends and first and second side edges with one of sad first and second side edges being pivotally mounted on said second axis, and
   said first side edge of said line tension sensor being pivotally mounted on said second axis and being located proximate said line guide.

37. The fishing reel according to claim 36 wherein said line tension sensor includes a member extending between said first and second ends and proximate said second edge for receiving the fishing line.

38. A method of braking a spool retaining a fishing line as slack occurs in the fishing line running from the spool when the fishing line is paid out therefrom, said method comprising the steps of:
   a. sensing slack in the fishing line;
   b. pre-braking said spool after slack in the fishing line is initially sensed; and
   c. abruptly braking said spool when increasing slack in the fishing line beyond the initial slack is sensed.

39. The method according to claim 38 wherein the step of pre-braking said spool includes friction braking.

40. The method according to claim 38 wherein the step of abruptly braking said spool includes wedge braking.

* * * * *